United States Patent
Katashiba

(10) Patent No.: US 10,222,198 B2
(45) Date of Patent: Mar. 5, 2019

(54) OPTICAL COHERENCE TOMOGRAPHIC APPARATUS, AND OPTICAL COHERENCE TOMOGRAPHIC SYSTEM

(71) Applicant: CANON KABUSHIKI KAISHA, Tokyo (JP)

(72) Inventor: Yuji Katashiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/763,238

(22) PCT Filed: Sep. 23, 2016

(86) PCT No.: PCT/JP2016/078964
§ 371 (c)(1),
(2) Date: Mar. 26, 2018

(87) PCT Pub. No.: WO2017/057652
PCT Pub. Date: Apr. 6, 2017

(65) Prior Publication Data
US 2018/0283846 A1   Oct. 4, 2018

(30) Foreign Application Priority Data

Sep. 30, 2015 (JP) ................ 2015-193788
Jul. 8, 2016 (JP) ................ 2016-135773

(51) Int. Cl.
*G01B 9/02* (2006.01)

(52) U.S. Cl.
CPC ..... *G01B 9/02091* (2013.01); *G01B 9/02058* (2013.01)

(58) Field of Classification Search
CPC .............. G01B 9/02091; G01B 9/0209; G01B 9/02058; A61B 3/102; A61B 5/0066
(Continued)

(56) References Cited

U.S. PATENT DOCUMENTS 3,421,808 A * 1/1969 Gottlieb ................ G02B 21/08
                                                              359/385
6,970,252 B2   11/2005 Knüttel
(Continued)

FOREIGN PATENT DOCUMENTS

CA          2412737 A1   12/2002
JP      2011-214968 A    10/2011

OTHER PUBLICATIONS

Feb. 2, 2017 International Search Report and Written Opinion in International Patent Appln. No. PCT/JP2016/078964.
(Continued)

*Primary Examiner* — Tarifur R Chowdhury
*Assistant Examiner* — Jonathon Cook
(74) *Attorney, Agent, or Firm* — Venable LLP

(57) ABSTRACT

Provided is an optical coherence tomographic apparatus, including: a light source configured to generate light; a light splitting unit configured to split the light from the light source into reference light and measuring light; a detection unit configured to detect intensity of combined light obtained by combining the reference light with return light from an object to be inspected, which is irradiated with the measuring light; an image forming unit configured to form a tomographic image of the object to be inspected based on the detected intensity; and a locating unit configured to locate one of a plurality of objective lenses having different focal lengths and having the same dispersion amount on an optical axis at a position on an optical path of the measuring light opposed to the object to be inspected.

17 Claims, 5 Drawing Sheets

(58) Field of Classification Search
USPC .................................................. 356/479, 497
See application file for complete search history.

(56) References Cited

U.S. PATENT DOCUMENTS

| | | |
|---|---|---|
| 7,034,271 B1 | 4/2006 | Sinclair et al. |
| 2004/0090633 A1 | 5/2004 | Knüttel |
| 2012/0133946 A1 | 5/2012 | Eckman et al. |
| 2012/0134011 A1* | 5/2012 | Fujiwara ............... H01S 3/0057 359/326 |
| 2013/0107275 A1 | 5/2013 | Boccara et al. |

OTHER PUBLICATIONS

Apr. 3, 2018 International Preliminary Report on Patentability in International Patent Appln. No. PCT/JP2016/078964.

* cited by examiner

FIG. 2
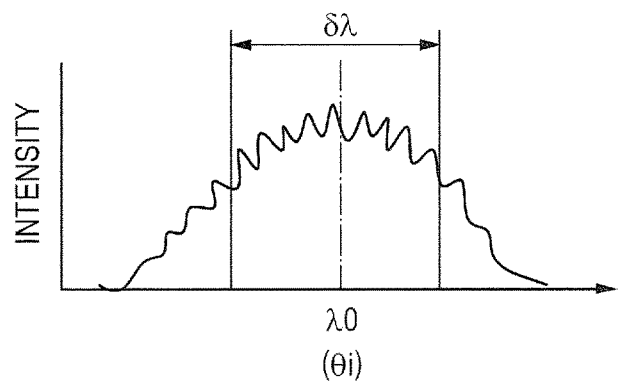
FIG. 3
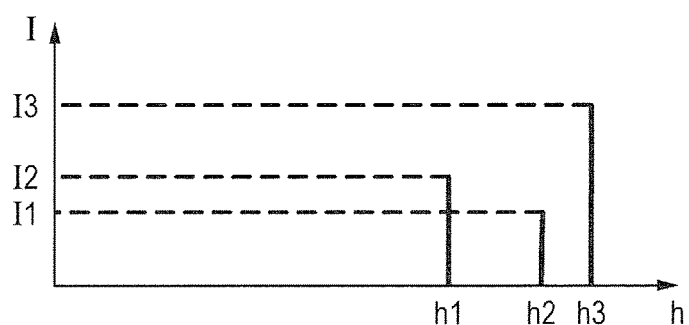
FIG. 4
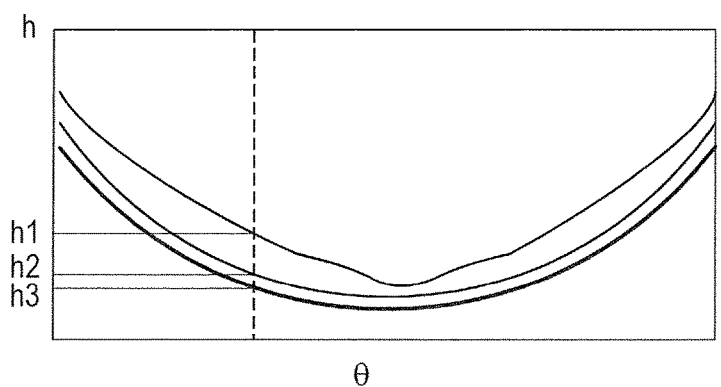
FIG. 5

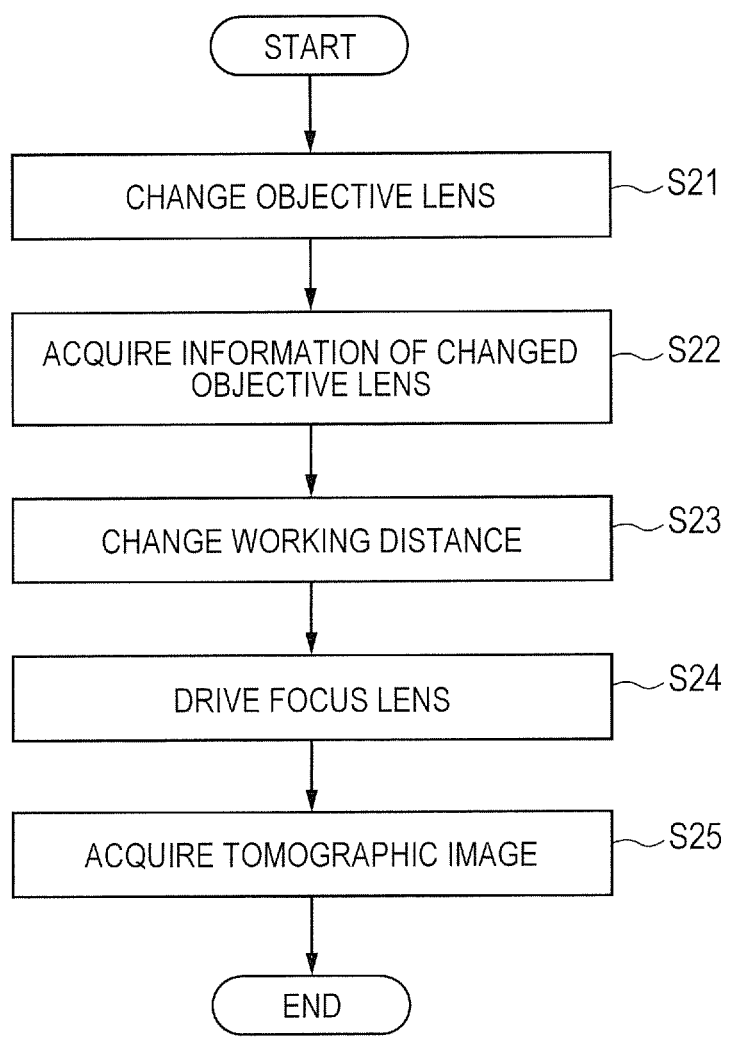

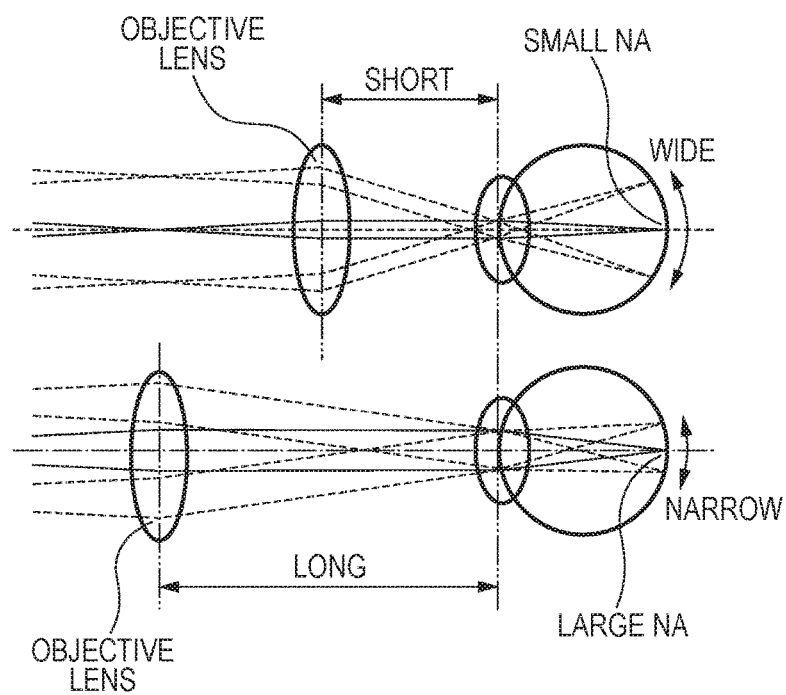

OPTICAL COHERENCE TOMOGRAPHIC APPARATUS, AND OPTICAL COHERENCE TOMOGRAPHIC SYSTEM

TECHNICAL FIELD

The present invention relates to an optical coherence tomographic apparatus to be used for acquiring a tomographic image of a fundus of an eye to be inspected or the like, and an optical coherence tomographic system.

BACKGROUND ART

An imaging apparatus using optical coherence tomography (OCT) in which interference due to low coherent light is utilized (hereinafter also referred to as OCT apparatus) is currently put into practical use. The OCT apparatus can take a tomographic image of an object to be inspected with high resolution.

In an OCT apparatus, light from a light source is split into measuring light and reference light by a beam splitter or the like. The measuring light irradiates an object to be inspected, e.g., an eye, via a measuring optical path. Then, return light from the object to be inspected is combined with reference light and is guided to a detector as interfering light via a detection optical path. The return light described here refers to reflected light and scattered light including information about an interface in the light irradiation direction with respect to the object to be inspected. The interfering light of the return light and the reference light is detected by the detector and is analyzed so that a tomographic image of the object to be inspected can be obtained.

Here, in order to acquire a tomographic image with high resolution in the OCT apparatus, it is necessary to match the dispersion amount of an optical system in the measuring optical path to that in a reference optical path. When the dispersion amounts are different, blurring occurs in a tomographic image, and the resolving power in a depth direction is degraded. Therefore, in the OCT apparatus, there has been known a configuration in which a dispersion compensating glass is arranged on the reference optical path to compensate for the dispersion with respect to the reference light. Further, in order to address the difference in dispersion caused by a machine difference among various optical elements arranged in the apparatus, there has been known a device configured to compensate for the difference by signal processing (see Patent Literature 1).

In the configuration disclosed in Patent Literature 1, through arrangement of the dispersion compensating glass in the reference optical path, the dispersion that occurs when the measuring light reciprocates between an eye to be inspected and a scanning optical system is compensated for with respect to the reference light. Further, through determination of a phase shift amount from the tomographic image, the difference in dispersion between the measuring light and the reference light is compensated for by signal processing.

Meanwhile, in fundus inspection, it is required to image a wide range so as to include a peripheral portion of a fundus, or image a specific part of the fundus with high resolution depending on the condition. Here, by changing an objective lens to an objective lens having a different focal length, the imaging range and the resolving power in a lateral direction can be switched. That is, through use of an objective lens having a shorter focal length, a wider range can be imaged with a low magnification, and through use of an objective lens having a longer focal length, a narrower range can be imaged with a high magnification and high resolution.

However, when an objective lens arranged on the measuring optical path is changed, the dispersion amount of the measuring optical path is varied due to the difference in dispersion between the objective lenses before and after the change, with the result that a difference in dispersion is caused between the measuring optical path and the reference optical path. When the difference in dispersion is caused, blurring occurs in a tomographic image as described above, and the resolving power in a depth direction is degraded. When the thickness of the dispersion compensating glass is changed for each objective lens in order to correct the difference in dispersion, a mechanism for this purpose is separately required, resulting in a complicated apparatus. Further, when the difference in dispersion is corrected by calculation processing, the calculation processing is performed for each objective lens, and hence a calculation load increases.

CITATION LIST

Patent Literature

PTL 1: Japanese Patent Application Laid-Open No. 2011-214968

SUMMARY OF INVENTION

Technical Problem

The present invention has been made in view of the above-mentioned circumstances, and it is an object of the present invention to provide an optical coherence tomographic apparatus capable of switching an optical magnification by changing an objective lens through use of a simple optical system without increasing a calculation load of dispersion compensation calculation.

Solution to Problem

In order to solve the above-mentioned problems, according to one embodiment of the present invention, there is provided an optical coherence tomographic apparatus, including:
  a light source configured to generate light;
  a light splitting unit configured to split the light from the light source into reference light and measuring light;
  a detection unit configured to detect intensity of combined light obtained by combining the reference light with return light from an object to be inspected, which is irradiated with the measuring light;
  an image forming unit configured to form a tomographic image of the object to be inspected based on the detected intensity; and
  a locating unit configured to locate one of a plurality of objective lenses having different focal lengths and having the same dispersion amount on an optical axis at a position on an optical path of the measuring light opposed to the object to be inspected.

Advantageous Effects of Invention

According to the present invention, the optical magnification can be switched by changing the objective lens through use of a simple optical system without increasing the calculation load of the dispersion compensation calculation.

Further features of the present invention will become apparent from the following description of exemplary embodiments with reference to the attached drawings.

BRIEF DESCRIPTION OF DRAWINGS

FIG. 2 is a graph for showing a shape of a signal according to the first embodiment of the present invention.

FIG. 3 is a graph for showing an output signal according to the first embodiment of the present invention.

FIG. 4 is a diagram for illustrating a tomographic image of the first embodiment of the present invention.

FIG. 5 is a view for illustrating a configuration of a low-magnification (wide angle of field) optical system according to the first embodiment of the present invention.

FIG. 8 is a flowchart for illustrating processing performed when an objective lens is changed in the first embodiment of the present invention.

FIG. 9A and FIG. 9B are illustrations of the relationship among the focal length of an objective lens, the field angle, and NA.

DESCRIPTION OF EMBODIMENTS

[First Embodiment]

Now, a first embodiment of the present invention is described in detail with reference to the attached drawings. An apparatus of this embodiment can take tomographic images of a retina and the like of a human eye, for example. The embodiments described below do not limit the present invention according to claims, and the entire combination of features described in the embodiments are not necessarily required for the solution to the problems in the present invention.

(Apparatus Configuration)

Figure 1:
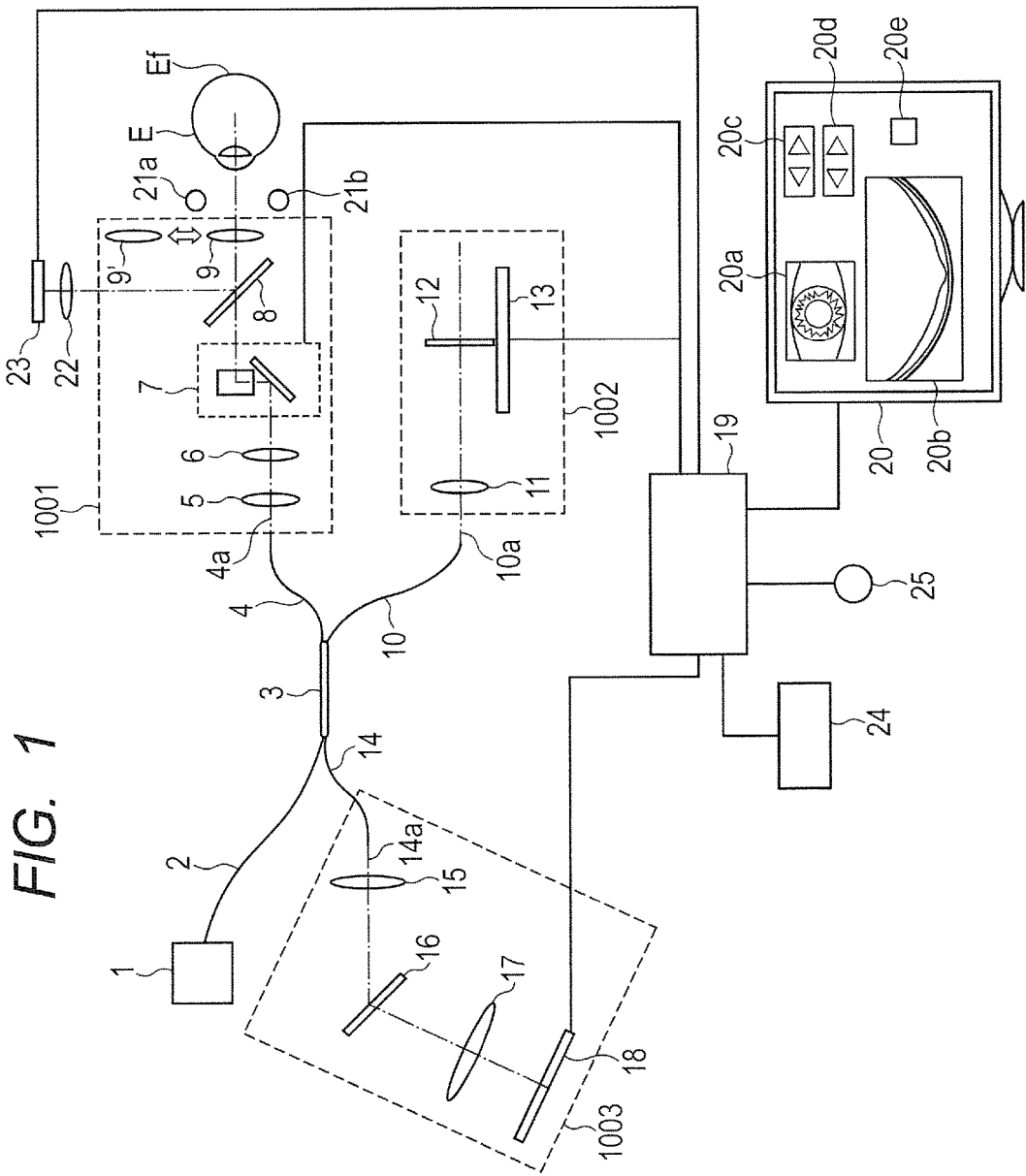
FIG. 1 is a schematic view for schematically illustrating a fundus image acquiring apparatus according to a first embodiment of the present invention.

As one mode of an optical coherence tomographic system according to this embodiment, a fundus image acquiring system is described with reference to FIG. 1. The fundus image acquiring system includes an optical coherence tomographic apparatus described later in detail, a plurality of objective lenses that can be changed, and a locating unit configured to selectively locate each of the objective lenses at a predetermined position on an optical path of measuring light.

A light source 1 in this embodiment is a light source configured to generate light (low coherence light). As the light source 1, a super luminescent diode (SLD) light source configured to emit light having a center wavelength of 850 nm and a band of 50 nm is used. Alternatively, an amplified spontaneous emission (ASE) light source may be employed as the light source 1. In addition, an ultrashort pulse laser light source, e.g., a titanium sapphire laser may be employed as the light source 1. In this way, any light source that can generate low coherence light may be employed as the light source 1. Further, a wavelength of light generated from the light source 1 is not particularly limited and is selected in the range of from 400 nm to 2 µm according to the object to be inspected. As the band width of the wavelength becomes wider, the longitudinal resolution becomes higher. In general, in the case where the center wavelength is 850 nm, a band width of 50 nm makes a longitudinal resolution of 6 µm while a band width of 100 nm makes a longitudinal resolution of 3 µm.

The light source 1 is connected to a sample arm 1001, a reference arm 1002, and a spectroscope 1003, which are described later, through light guiding portions 2, 4, 10, and 14 formed of optical fibers or the like. A light flux emitted by the light source 1 is guided to a light splitting portion 3 by the light guiding portion 2. As the light splitting portion 3 serving as a light splitting unit according to this embodiment, a fiber coupler or the like can be employed. A split ratio is set to an appropriate value in accordance with the object to be inspected.

On the optical path split by the light splitting portion 3 to the light guiding portion 4 side, there are arranged a collimator lens 5, a focus lens 6, a light scanning portion 7, a wavelength branching mirror 8, and an objective lens 9, which constitute the sample arm 1001. An objective lens mounting portion (not shown) serving as a locating unit according to this embodiment is configured to change the objective lens 9 to an objective lens 9' having a different focal length. As the light scanning portion 7, Galvano mirrors, resonant mirrors, or the like, which are arranged adjacent to each other in an optical axis direction (tandem arrangement) and configured to scan light in X and Y directions orthogonal to each other, are employed. The wavelength branching mirror 8 is configured to transmit the light (wavelength: λ=800 to 900 nm) emitted by the light source 1, and to reflect light (λ=940 nm) of an anterior ocular segment illumination light source. The light guided to the light guiding portion 4 passes through the sample arm 1001 to reach a fundus Ef of an eye E to be inspected.

On the optical path of the light split by the light splitting portion 3 to the light guiding portion 10 side, there are arranged a collimator lens 11 and a reference mirror 12, which constitute the reference arm 1002. The reference mirror 12 is arranged on a linear stage 13, and an optical path length of the reference arm 1002 is adjusted by moving the linear stage 13 in the optical axis direction.

A collimator lens 15, a spectroscopic portion 16, an imaging lens 17, and an imaging portion 18 form the spectroscope 1003. The spectroscopic portion 16 is formed of a grating serving as a diffraction grating, a prism, or the like. The imaging portion 18 serves as a detection unit according to this embodiment and includes photoelectric conversion elements such as a CMOS and a CCD. Light from the light splitting portion is guided to the spectroscope 1003 by the light guiding portion 14 connected to the light splitting portion 3.

A control portion 19 serving as a control unit configured to control the imaging apparatus is configured to control the light scanning portion 7, the linear stage 13, the imaging portion 18, and the like. Further, a display portion 20, a memory 24, and a pointing device 25, e.g., a mouse are connected to the control portion 19.

Anterior ocular segment illumination light sources 21a and 21b are arranged on the periphery of the objective lens 9. An image of an anterior ocular segment of the eye E to be inspected illuminated by the anterior ocular segment illumination light sources 21a and 21b passes through the objective lens 9 and is reflected by the wavelength branching mirror 8, to thereby form an image on an imaging surface of the two-dimensional imaging portion 23 by a lens 22.

(Measurement Method)

Figure 7:
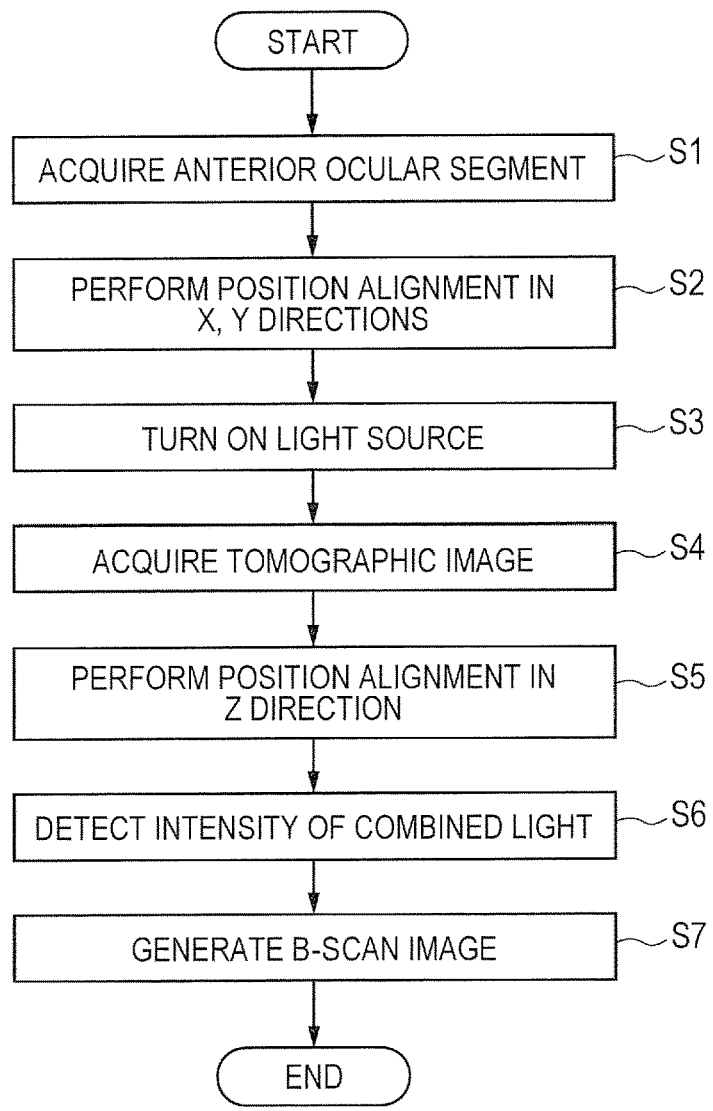
FIG. 7 is a flowchart for illustrating the steps of acquiring a tomographic image in the first embodiment of the present invention.

Next, a method of taking a tomographic image of a retina of the fundus Ef of the eye E to be inspected through use of an apparatus having the above-mentioned configuration is described with reference to the flowchart of FIG. 7 for illustrating the steps of this method.

When the eye E to be inspected is set in front of this apparatus, the anterior ocular segment of the eye E to be inspected is illuminated by light emitted from the anterior ocular segment illumination light sources 21a and 21b. An image of the anterior ocular segment illuminated in this manner passes through the objective lens 9 and is reflected by the wavelength branching mirror 8 to be formed on the imaging surface of the imaging portion 23 by the lens 22. An image signal from the imaging portion 23 is input to the control portion 19 and is converted into digital data in real time such that an anterior ocular segment image is generated (Step S1). The control portion 19 determines eccentricity of the eye E to be inspected and a focus state based on the anterior ocular segment image, particularly a pattern of an iris of the eye E to be inspected. Because the center of the imaging surface is adjusted to match with the optical axis of the optical system of the sample arm 1001, an eccentricity amount between the imaging center and the pupil center of the anterior ocular segment image taken by the imaging portion 23 corresponds to an eccentricity amount between the eye E to be inspected and the optical system of the sample arm 1001.

The optical system of the sample arm 1001 is arranged on a stage (not shown) so that the position thereof can be aligned in upper, lower, left, and right directions with respect to the eye E to be inspected, and further in an optical axis direction. Thus, as described above, the positions in upper, lower, left, and right directions are aligned such that the optical axis is matched to the pupil center, and the position in the optical axis direction is aligned such that the contrast of the pattern of the iris becomes the maximum (Step S2). With this, the distance (working distance) between the pupil of the eye E to be inspected that is flush with the iris and the objective lens 9 of the optical system of the sample arm 1001 is kept constant. The anterior ocular segment image is displayed on an anterior ocular segment display region 20a of the display portion 20, and an operator can confirm optical axis eccentricity from the displayed image.

When the eccentricity amount between the pupil center and the imaging center reaches a predetermined value or less due to auto-alignment, the light source 1 is turned on to start taking a tomographic image for alignment (Step S3). The light from the light source 1 is guided to the light splitting portion 3 through the light guiding portion 2 and split such that the ratio of optical amounts guided to the light guiding portions 4 and 10 reaches, for example, 1:9. The light guided to the light guiding portion 4 side reaches a fiber end 4a. The light emitted from the fiber end 4a serving as a point light source is converted into collimated light as measuring light by the collimator lens 5 and transmitted through the focus lens 6. The measuring light having been transmitted through the focus lens 6 is transmitted through the wavelength branching mirror through the light scanning portion 7, to thereby reach the fundus Ef from the pupil of the eye E to be inspected by the objective lens 9. In this case, the fundus Ef is scanned with the measuring light by the operation of an X scanner mirror of the light scanning portion 7.

The measuring light is reflected and scattered by a plurality of layers forming the retina of the fundus Ef and returns as return light through the same optical path as that at a time of incidence. That is, the return light enters the light guiding portion 4 from the fiber end 4a through the collimator lens 5 and is guided to the light splitting portion 3.

The light guided to the light guiding portion 10 through the light splitting portion 3 reaches the reference arm 1002 and is output from a fiber end 10a. Then, the light is converted into collimated light by the collimator lens 11 and directed to the reference mirror 12. The reference mirror 12 is arranged on the linear stage 13 perpendicularly to the collimated light so as to move in the optical axis direction. With this, the optical path length of the measuring light can be matched to the optical path length of a reference optical path also with respect to the eye E to be inspected having a different eye axial length. The operator operates the pointing device 25 to designate a coherence gate adjustment display region 20d on the display portion 20 with a cursor, to thereby be capable of adjusting the position of the reference mirror 12. The reference light reflected by the reference mirror 12 is converged onto the fiber end 10a of the light guiding portion 10 by the collimator lens 11 and guided to the light splitting portion 3 by the light guiding portion 10.

The return light and the reference light are combined in the light splitting portion 3 to generate combined light or interference light. In the light splitting portion 3, the light is split such that the ratio of the optical amounts guided to the light guiding portions 2 and 14 reaches 1:9. The splitting ratio in this case is opposite to that of the return light from the eye E to be inspected. The interference light having reached the spectroscope 1003 through the light guiding portion 14 is output from a fiber end 14a. The interference light is further converted into collimated light by the collimator lens 15 and enters the spectroscopic portion 16. In the spectroscopic portion 16, a large number of diffraction gratings each having a dimension close to the wavelength of the light are formed at equal intervals and spectrally diffract the incident light through diffraction.

The diffraction angle varies depending on the wavelength. Therefore, the diffracted light is formed into a line image by the imaging lens 17 in a line-shaped imaging region of the imaging portion 18. That is, the light output from the fiber end 14a is formed into a spectrally diffracted slit image. Thus, a signal corresponding to the intensity for each wavelength is output from the imaging portion 18. The signal from the imaging portion 18 is input to the control portion 19 serving as an image forming unit according to this embodiment to generate a tomographic image, and the tomographic image is displayed in a tomographic image display region 20b of the display portion 20 (Step S4).

The operator observes the tomographic image and performs focus adjustment by operating buttons in a focus adjustment display region 20c with the cursor through use of the pointing device 25 such that the tomographic image becomes brightest. Further, the operator performs position alignment (coherence gate adjustment) of the reference mirror 12 similarly by operating buttons in the coherence gate adjustment display region 20d such that all of the tomographic image of a part of interest falls within a desired region of the tomographic image display region 20b. When the control portion 19 is instructed on position alignment of the reference mirror 12 by the coherence gate adjustment display region 20d, the control portion 19 moves the position of the linear stage 13 in the designated direction (Step S5). Simultaneously, the control portion 19 changes the control position information of the linear stage 13 stored in the memory 24 in accordance with the movement amount.

The linear stage 13 is driven and controlled by a stepping motor (not shown), and the position of the linear stage 13 corresponds to the number of steps designated to the stepping motor. For example, when a stroke of 60 mm is driven by 60,000 steps, the movement amount per step is 1 µm. The number of steps of from 0 to 60,000 corresponds to the position of from 0 mm to 60 mm of the linear stage 13. Further, the distance from the reference position of the linear stage 13 to the collimator lens 11 is set with high accuracy in terms of design, and the relationship between the reference position and the stage position is clear in terms of design. Therefore, the reference optical path length can be calculated based on the number of steps.

As described above, the optical path length of the reference optical path changes along with the change in position of the reference mirror 12. With this, the display position of the tomographic image in the tomographic image display region 20b changes. Thus, the position of the reference mirror 12 is constantly stored in the memory 24. After the imaging preparation as described above, when an imaging button 20e is pressed, interference intensity described later for taking a still image of the tomographic image (intensity of combined light) is detected (Step S6). When the interference intensity is obtained, a tomographic image (B-scan image described later) is generated based on the interference intensity (Step S7). The generated tomographic image is stored in the memory 24.

(Tomographic Image Generation)

Next, tomographic image generation is described.

When the tomographic image is taken, the combined light of the return light from the fundus Ef of the eye E to be inspected and the reference light reflected by the reference mirror 12 is guided to the light guiding portion 14. Because of a difference between the optical path length from the light splitting portion 3 to the fundus Ef and the optical path length from the light splitting portion 3 to the reference mirror 12, there is a phase difference between the return light and the reference light when being combined by the light splitting portion 3. A tomographic image is formed based on detection results obtained by detecting the intensity of an interference signal based on the phase difference.

More specifically, the phase difference varies depending on the wavelength, and hence interference fringes are generated in a spectral intensity distribution appearing in a light-receiving region of the imaging portion 18. Further, the retina includes a plurality of layers, and return light from each layer boundary has a different optical path length. Therefore, the interference fringes include interference fringes having different frequencies. The position of a reflective object and the brightness corresponding to the reflection and scattering from the position can be determined based on the frequencies and the intensities of the interference fringes included in the intensity distribution.

In a B-scan mode of scanning one line on a fundus, the control portion 19 reads an output from the imaging portion 18 while driving one of X- and Y-scan mirrors of the light scanning portion 7, e.g., only the X-scan mirror. Data indicating an angle of the scan mirror is output from the light scanning portion 7, and the read signal is converted into an incident angle θi at which the light enters the eye E to be inspected and is further converted into digital data. Then, the digital data is stored in the memory 24. The angle of the scan mirror and the incident angle θi of a light beam correspond to each other and are determined based on design values of the optical system.

FIG. 2 is a graph for showing an intensity distribution of light on the imaging portion 18 at each angle when the incident angle θi is defined as the angle of the scan mirror. The horizontal axis represents a sensor position on the imaging portion 18 and corresponds to a wavelength. The vertical axis represents signal intensity. Here, a waveform caused by interference fringes overlap a center wavelength λ0 and a half width δλ of an intensity distribution.

This waveform intensity information is read out and is converted by an A/D converter into digital data, which is stored in the memory 24. Wave number conversion and frequency conversion of the data are performed, and hence the intensity distribution as shown in FIG. 3 is obtained. This indicates that interference intensities at distances (from the coherence gate) h1, h2, and h3 are I2, I1, and I3. Therefore, the interference intensity is measured while the scan mirror angle θi is changed from θs to θe. The interference intensity I (θi, hj) acquired in this way is displayed with θ on the horizontal axis and h on the vertical axis, and hence a B-scan image of the fundus (image based on the optical distance) can be displayed as illustrated in FIG. 4.

(Change of Optical Magnification)

Next, a method of changing a magnification of an optical system is described. The processing performed by the control portion 19 and the like at a time of changing a magnification is described with reference to the flowchart of FIG. 8.

Figure 6:
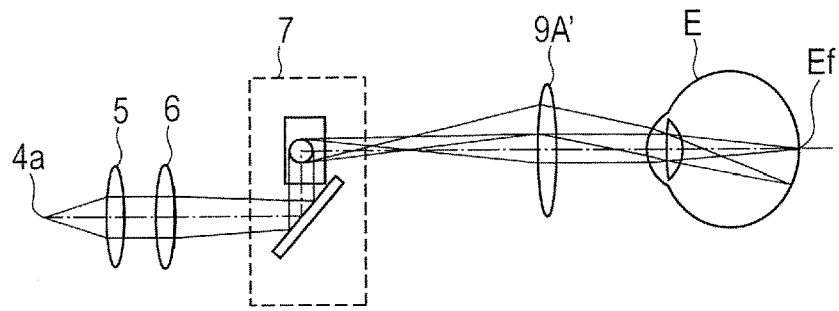
FIG. 6 is a view for illustrating a configuration of a high-magnification (narrow angle of field) optical system according to the first embodiment of the present invention.

FIG. 5 and FIG. 6 are each a view for illustrating a schematic configuration of an optical system of the sample arm 1001 according to the first embodiment. In FIG. 5 and FIG. 6, the optical path on the light source 1 side from the fiber end 4a and the wavelength branching mirror 8 are omitted. The objective lens and the position thereof, and the focus lens position are different between FIG. 5 and FIG. 6. FIG. 5 is an illustration of the configuration and arrangement of the optical system during imaging at a low magnification (wide angle of field), and FIG. 6 is an illustration of the configuration and arrangement of the optical system during imaging at a high magnification (narrow angle of field).

In FIG. 5 and FIG. 6, an axial light flux and a most off-axis light flux are schematically illustrated. In FIG. 5, the light output from the fiber end 4a is transmitted through the collimator lens 5 and the focus lens 6, and is scanned by the light scanning portion 7. The light flux deflected by the light scanning portion is transmitted through an objective lens 9A to be converged onto the fundus Ef of the eye E to be inspected. In this case, the position of the focus lens 6 on the optical axis is set such that the optical amount of return light that is reflected by the fundus Ef and passes through a reverse optical path to enter the fiber end 4a becomes maximum, and the brightness of a tomographic image displayed on the display portion 20 becomes maximum.

FIG. 9A and FIG. 9B are illustrations of the relationship among the focal length of an objective lens, the field angle, and NA. In FIG. 9A, an axial light flux that enters the eye to be inspected is schematically illustrated with the solid line, and a most off-axial light flux is schematically illustrated with the broken line. As illustrated in FIG. 9A, when the focal length of the objective lens is small, the distance (working distance) from the objective lens to the pupil of the eye to be inspected becomes small, and the angle (field angle) at which the most off-axial light flux enters the pupil becomes large. With this, the imaging range on the fundus is enlarged. Meanwhile, the pupil imaging magnification changes in a contraction direction, and hence the light flux diameter on the pupil becomes small. With this, the NA of the light flux that enters the fundus becomes small, and the diameter of a light spot formed on the fundus becomes large, with the result that the resolving power in the lateral direction is degraded. In contrast, when the focal length of the objective lens is large, the working distance becomes large, and the field angle becomes small. With this, the imaging range on the fundus is narrowed. Further, the pupil imaging magnification changes in an enlargement direction, and hence the diameter of the light flux on the pupil becomes large. With this, the NA of the light flux that enters the fundus becomes large, and the diameter of a light spot formed on the fundus becomes small, with the result that the resolving power in the lateral direction is improved. The relationship of the foregoing is summarized as a table in FIG. 9B. As shown in the table, when the objective lens having a small focal length is used, the NA becomes small, and the field angle becomes large. Further, when the objective lens having a large focal length is used, the NA becomes large, and the field angle becomes small.

Next, a method of changing a magnification through change of an objective lens to be arranged so as to be opposed to the eye to be inspected is described. First, the objective lens 9A is removed from the objective lens mounting portion (not shown), and an objective lens 9A' having a focal length different from that of the objective lens 9A is mounted (Step S21). In this case, an objective lens barrel (not shown) formed such that the position of the objective lens on the optical axis is set to a predetermined design position is mounted on the objective lens mounting portion (not shown). As a mounting mechanism, a known mount mechanism such as a bayonet type mechanism can be used.

Next, a sensor (not shown) arranged on the objective lens mounting portion detects the mounted objective lens 9A'. The objective lens 9A' may be detected, for example, by arranging an object to be detected, e.g., a reflecting mirror, in the objective lens barrel and detecting the object to be detected with the sensor arranged on the objective lens mounting portion. Alternatively, the objective lens 9A' may be detected by arranging a protrusion in the objective lens barrel and pressing a switch button (sensor) arranged on the objective lens mounting portion. The information of the objective lens detected by the sensor is sent to the control portion 19 (Step S22). Those sensors form a lens information acquiring unit configured to acquire the information of the objective lens.

The memory 24 stores a table of the objective lens information serving as information specific to the changed objective lens, e.g., a working distance and a focus lens position in accordance with each objective lens. The control portion 19 changes the working distance as necessary based on the information of the mounted objective lens and the table of a working distance (Step S23). Further, the control portion 19 changes the position of the focus lens 6 in the optical axis direction based on the information of the mounted objective lens and the table of the focus lens position (Step S24). The table of the focus lens position may be determined in advance through calculation from a design value or may be determined by recording the focus lens position in each objective lens in advance for each manufactured apparatus. The control portion 19 controls the position of the focus lens that is arranged in the optical path of the measuring light and adjusted for a focus position. Then, the focus lens position is driven and controlled in accordance with the information of the objective lens, more specifically, the information of the objective lens acquired by the sensor. After the completion of those operations, the step of generating and acquiring the tomographic image described above (Step S25) is performed.

In this embodiment, the objective lenses 9A and 9A' have the same thickness and are designed with the same glass material. Further, the objective lenses 9A and 9A' are designed to have different focal lengths by setting different radii of curvature. Here, the dispersion amount on the optical axis is calculated through multiplication v·d of group velocity dispersion v of the glass material and thickness d of the glass material on the optical axis. The group velocity dispersion v is defined by Expression (8).

$$v = -\lambda \cdot (d^2 N/d\lambda^2) \tag{8}$$

In Expression (8), $\lambda$ represents a wavelength of light, and N represents a refractive index of the glass material. In this embodiment, the group velocity dispersion of the objective lens 9A' can be set to be the same as that of the objective lens 9A by using the same glass material, and the dispersion amount of the objective lens 9A' can be set to be the same as that of the objective lens 9A by setting the same thickness.

Thus, even when the objective lens is changed, the dispersion amount on the optical axis of the optical system remains unchanged. Therefore, a tomographic image of high image quality can be acquired without changing the correction processing of dispersion compensation through calculation processing for each objective lens or the like.

Further, in this embodiment, the distance (working distance) from the objective lens to the eye E to be inspected is changed in accordance with the focal length of the objective lens 9A' so as to prevent the optical path length from the fiber end 4a to the fundus Ef on the optical axis, that is, the optical distance from being changed. With this, even when the objective lens is changed, the optical path length of the sample arm 1001 is prevented from being changed. Thus, imaging can be performed without changing the position of the reference mirror 12 for each objective lens, and it is not necessary to enlarge the movement range of the reference mirror 12 so as to support the change of the objective lens. Therefore, it is not necessary to increase the movement space of the reference mirror 12, with the result that the apparatus can be prevented from being enlarged.

Further, the objective lenses 9A and 9A' may include an aspheric surface in which a curvature becomes smaller in a peripheral portion as compared to that on the optical axis. When the magnification is decreased (angle of field is widened) by decreasing the focal length of the objective lens, an aberration on the pupil increases due to a lens spherical aberration. When the aberration on the pupil is increased, it becomes difficult to cause light fluxes with all the field angles to enter the fundus from the pupil, resulting in difficulty in alignment during imaging. When the objective lens includes an aspheric surface in which a curvature becomes smaller in a peripheral portion as compared to that on the optical axis, the spherical aberration can be reduced, and the aberration on the pupil can be reduced.

As described above, in this embodiment, by setting the thickness of the objective lens 9A to be substantially equal to that of the objective lens 9A' and using the same glass material for both the objective lenses 9A and 9A', the dispersion amounts on the optical axis can be matched to each other. Thus, a tomographic image of high image quality having only slight blurring can be acquired without the need to correct dispersion compensation through calculation processing during changing a magnification.

The objective lens can also be handled as a single element, but in general, the objective lens is handled as a lens unit in which the eye to be inspected side and the mounting side are sealed with lens-like members, and a lens serving substantially as an objective lens is fixed therein. In the lens unit, the lens is arranged at a predetermined position on the optical axis that connects the centers of the two lens-like sealing members. At this predetermined position, when the lens unit is fixed onto a mount on the apparatus side, the distance from the objective lens to the eye to be inspected can be automatically set to the focal length of the objective lens without changing the optical path length from the fiber end 4a to the fundus Ef on the optical axis.

Further, an objective lens may be selected from a plurality of objective lenses in accordance with the imaging range, and the objective lens can be automatically inserted and separated with respect to the arrangement in accordance with the focal length of the selected objective lens. In this case, a plurality of mounting portions in accordance with the focal length of each objective lens are arranged on the optical axis in advance, and the selected objective lens is automatically inserted into or separated from the corresponding mounting portion. Such configuration of automatic insertion and separation is included in one mode of a locating unit according to the present invention. That is, the locating unit according to this embodiment selectively locates each of a plurality of objective lenses having different focal lengths and having the same dispersion amount on the optical axis at a position on the optical path of the measuring light opposed to an object to be inspected.

In this embodiment, the necessity of correcting dispersion compensation is reduced by setting the dispersion amounts in the plurality of objective lenses to be equal. However, when the difference in dispersion amount among the objective lenses is a predetermined amount or less, even in the case where the calculation processing is required, the effect of suppressing an increase in a calculation load is obtained. This predetermined amount is an amount in which dispersion compensation calculation for forming a tomographic image is required, and in this embodiment, the difference in dispersion amount of 60 is obtained as this predetermined amount. The dispersion amount of 60 is an amount corresponding to 2 mm when converted into the thickness of a glass material having a refractive index N of 1.509 and ν of 0.030 μm$^{-1}$. As described above, when the dispersion amount is different, blurring occurs in a point image intensity distribution in a depth direction, and the resolving power in the depth direction is degraded. However, when the difference in dispersion amount is 2 mm or less when converted into the thickness of the glass material as described above, there is substantially no influence on the point image intensity distribution, and the resolving power in the depth direction is not degraded. Thus, in this embodiment, the effect is obtained when the difference in dispersion amount is the predetermined amount of 60 or less. The "plurality of objective lenses having the same dispersion amount" in the present invention is intended to include a case where the difference in dispersion amount of the objective lenses is 60 or less as well as a case where the difference in dispersion amount is zero. Further, the same also applies to the difference in optical path length of the plurality of objective lenses, and the optical path lengths are set to be equal to each other in this embodiment. However, when the optical path length difference is 1 mm or less, the movement range of the reference mirror can be suppressed. Further, in this embodiment, although the plurality of objective lenses having the same dispersion amount on the optical axis are used, the dispersion amount is not the same in the measuring light passing through a region outside of the optical axis of the objective lens. The difference in dispersion amount may be subjected to dispersion compensation through calculation when the measuring light passes through the periphery (outside of the optical axis) of the objective lens.

[Second Embodiment]

Next, an optical system according to a second embodiment of the present invention is described. In the second embodiment, unlike the first embodiment, when the respective objective lenses are defined as an objective lens 9B and an objective lens 9B', cemented doublet lenses using different glass materials are used. The glass material and center thickness of each of the objective lenses are set such that the dispersion amounts on the optical axis and the center thicknesses of the cemented lenses are the same.

Here, the refractive indexes of two lenses 9B1 and 9B2 of the objective lens 9B are represented by N1 and N2, respectively. The group velocity dispersions thereof are represented by ν1 and ν2, respectively. The center thicknesses thereof are represented by d1 and d2, respectively. Further, the refractive indexes of two lenses 9B1' and 9B2' of the objective lens 9B' are represented by N3 and N4, respectively. The group velocity dispersions thereof are represented by ν3 and ν4, respectively. The center thicknesses thereof are represented by d3 and d4, respectively.

When the dispersion amount on the optical axis of the objective lens 9B is equal to that of the objective lens 9B', Expression (1) is satisfied.

$$\nu1 \cdot d1 + \nu2 \cdot d2 = \nu3 \cdot d3 + \nu4 \cdot d4 \quad (1)$$

Further, when the center thickness of the objective lens 9B is equal to that of the objective lens 9B', Expression (2) is satisfied.

$$d1 + d2 = d3 + d4 \quad (2)$$

When the glass material and center thickness of the objective lens 9B are determined, and achromatic design is performed to determine the glass material of the objective lens 9B', in order to set the dispersion and center thickness of the objective lens 9B to be equal to those of the objective lens 9B', d3 and d4 need to satisfy Expressions (3) and (4).

$$d3 = \{(\nu1-\nu4) \cdot d1 + (\nu2-\nu4) \cdot d2\}/(\nu3-\nu4) \quad (3)$$

$$d4 = \{(\nu1-\nu3) \cdot d1 + (\nu2-\nu3) \cdot d2\}/(\nu4-\nu3) \quad (4)$$

Here, in this embodiment, the glass material of the lens 9B1 has the refractive index N1 of 1.595, the group velocity dispersion ν1 of -0.037 μm$^{-1}$, and the center thickness d1 of 18.7 mm. Further, the glass material of the lens 9B2 has the refractive index N2 of 1.781, the group velocity dispersion ν2 of -0.133 μm$^{-1}$, and the center thickness d2 of 2.2 mm. Thus, the color aberration is also corrected by using a convex lens having low dispersion as the lens 9B1 and a concave lens having high dispersion as the lens 9B2.

Further, the glass material of the lens 9B1' has the refractive index N3 of 1.556, the group velocity dispersion ν3 of -0.036 μm$^{-1}$ and the center thickness d3 of 18.1 mm. The glass material of the lens 9B2' has the refractive index N4 of 1.734, the group velocity dispersion ν4 of -0.115 μm$^{-1}$, and the center thickness d4 of 2.8 mm. Thus, the color aberration is also corrected by using a convex lens having low dispersion as the lens 9B1' and a concave lens having high dispersion as the lens 9B2'.

The thickness d3 of the lens 9B1' satisfies Expression (3), and the thickness d4 of the lens 9B2' satisfies Expression (4). With this, both the lenses 9B and 9B' have the same dispersion amount of -977 and have the same center thickness of 20.9 mm. Thus, a calculation load can be reduced without the need to perform calculation processing of dispersion compensation for each objective lens by setting the dispersion to be equal between the lenses 9B and 9B'.

[Third Embodiment]

Next, an optical system according to a third embodiment of the present invention is described. In the third embodiment, unlike the first embodiment, when the respective objective lenses are defined as an objective lens 9C and an objective lens 9C', cemented doublet lenses using different glass materials are used. The glass material and center thickness of each of the objective lenses are set such that the dispersion amounts on the optical axis and the optical path lengths on the optical axis in the cemented lenses, that is, the optical distances are the same.

Here, the refractive indexes of two lenses 9C1 and 9C2 of the objective lens 9C are represented by N1 and N2, respectively. The group velocity dispersions thereof are represented by v1 and v2, respectively. The center thicknesses thereof are represented by d1 and d2, respectively. Further, the refractive indexes of two lenses 9C1' and 9C2' of the objective lens 9C' are represented by N3 and N4, respectively. The group velocity dispersions thereof are represented by v3 and v4, respectively. The center thicknesses thereof are represented by d3 and d4, respectively. When the dispersion on the optical axis of the objective lens 9C is equal to that of the objective lens 9C', Expression (1) is satisfied.

When the optical path length on the optical axis of the objective lens 9C is equal to that of the objective lens 9C', Expression (5) is satisfied.

$$N1 \cdot d1 + N2 \cdot d2 = N3 \cdot d3 + N4 \cdot d4 \quad (5)$$

When the glass material and center thickness of the objective lens 9C are determined, and achromatic design is performed to determine the glass material of the objective lens 9C', in order to set the dispersion and optical path length on the optical axis of the objective lens 9C to be equal to those of the objective lens 9C', d3 and d4 need to satisfy Expressions (6) and (7).

$$d3 = \{(N1 \cdot d1 + N2 \cdot d2) \cdot v4 - (v1 \cdot d1 + v2 \cdot d2) \cdot N4\} / (N3 \cdot v4 - N4 \cdot v3) \quad (6)$$

$$d4 = \{(N1 \cdot d1 + N2 \cdot d2) \cdot v3 - (v1 \cdot d1 + v2 \cdot d2) \cdot N3\} / (N4 \cdot v3 - N3 \cdot v4) \quad (7)$$

Here, in this embodiment, the glass material of the lens 9C1 has the refractive index N1 of 1.595, the group velocity dispersion v1 of $-0.037$ $\mu m^{-1}$, and the center thickness d1 of 18.7 mm. Further, the glass material of the lens 9C2 has the refractive index N2 of 1.781, the group velocity dispersion v2 of $-0.133$ $\mu m^{-1}$, and the center thickness d2 of 2.2 mm. Thus, the color aberration is also corrected by using a convex lens having low dispersion as the lens 9C1 and a concave lens having high dispersion as the lens 9C2.

Further, the glass material of the lens 9C1' has the refractive index N3 of 1.556, the group velocity dispersion v3 of $-0.036$ $\mu m^{-1}$ and the center thickness d3 of 18.8 mm. The glass material of the lens 9C2' has the refractive index N4 of 1.734, the group velocity dispersion v4 of $-0.115$ $\mu m^{-1}$, and the center thickness d4 of 2.6 mm.

Thus, a color aberration is also corrected by using a convex lens having low dispersion as the lens 9C1' and a concave lens having high dispersion as the lens 9C2'. The thickness d3 of the lens 9C1' satisfies Expression (6), and the thickness d4 of the lens 9C2' satisfies Expression (7).

With this, both the lenses 9C1' and 9C2' have the same dispersion amount of $-977$ and have the same optical path length on the optical axis of 33.7 mm. Thus, a calculation load can be reduced without the need to perform calculation processing of dispersion compensation for each objective lens by setting the dispersion to be equal between the lenses 9C1' and 9C2'. Further, the movement range of the reference mirror can be suppressed without the need to perform position alignment of the reference mirror by setting the optical path length on the optical axis to be equal between the lenses 9C1' and 9C2'.

[Other Embodiment]

The exemplary embodiments of the present invention are described above, but the present invention is not limited to those embodiments and can be modified and changed variously within the scope of the gist thereof. In the above-mentioned first embodiment, the change of two kinds of objective lenses having different focal lengths is described. However, the objective lenses are not limited to two kinds, and three or more kinds of objective lenses may be configured to be changed. Further, in the above-mentioned embodiment, detailed description is mainly given of the configuration in which lens units each including different objective lenses are changed. For example, the locating unit can also be configured to automatically select an objective lens from a plurality of objective lenses as a single element and automatically locate the selected objective lens at a position on the optical axis in accordance with the selected objective lens. In this case, the locating unit automatically inserts or separates the objective lens selected from the plurality of objective lenses with respect to an optical path. As a specific mechanism, a known mechanism in an imaging apparatus for inserting or separating different lenses with respect to the optical path can be adopted.

Further, the above-mentioned locating unit may be configured to selectively locate a plurality of objective lenses having different focal lengths at distances from an object to be inspected in accordance with the focal lengths of the selected objective lenses in the optical path of the measuring light. Alternatively, the locating unit may be configured to selectively locate each of a plurality of objective lenses having different focal lengths and having the same longitudinal resolution of a tomographic image at a position on the optical path of the measuring light opposed to the object to be inspected. Alternatively, the locating unit may be configured to selectively locate each of a plurality of objective lenses having different focal lengths at a position on the optical path of the measuring light opposed to the object to be inspected. Thus, even when the locating unit is configured to locate a plurality of objective lenses so as to satisfy arbitrary conditions, such as the focal lengths on the measuring optical path in accordance with the objective lenses, the uniformity of the longitudinal resolution of a tomographic image acquired through use of the objective lenses, and the positions of the objective lenses on the optical path opposed to the object to be inspected, the object of the present invention can be achieved at least partially. Further, the present invention may also be constructed as an optical coherence tomographic system through use of the objective lenses located by the locating unit and the optical coherence tomographic apparatus in which the objective lenses are arranged.

Further, in the first embodiment, the focus lens position is determined based on, for example, the focal length that is information of the mounted objective lens, but a method of determining the focus lens position is not limited thereto. For example, after the change of the objective lens, the focus lens position may be readjusted in consideration of the brightness of a tomographic image. Further, for example, an optical system of a scanning laser ophthalmoscope (SLO) configured to image an eye to be inspected through laser scanning may be separately configured to acquire focus position information from a contrast and luminance of an SLO image, and the focus lens position may be determined based on the information.

Further, in the first embodiment, a spectral-domain OCT (SD-OCT) system using a wide-bandwidth light source and a spectroscope is employed as a system configured to acquire a tomographic image. However, a swept-source OCT (SS-OCT) system using a wavelength variable light source may be employed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the present invention is not limited to the above-mentioned embodiments and can be carried out by being variously altered and modified within the range not departing from the spirit of the present invention. For example, in the above-mentioned embodiments, the case where the object to be inspected is an eye is described, but the present invention can also be applied to objects to be inspected other than an eye, for example, skin or an organ. In this case, the present invention encompasses a mode other than the fundus image acquiring apparatus or system, for example, medical equipment such as an endoscope. Thus, it is desired that the present invention be grasped as the tomographic image acquiring apparatus or system, as exemplified by the fundus image acquiring apparatus, and the eye to be inspected be grasped as one mode of the object to be inspected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-193788, filed Sep. 30, 2015 and Japanese Patent Application No. 2016-135773, filed Jul. 8, 2016, which are hereby incorporated by reference herein in their entirety.

The invention claimed is:

1. An optical coherence tomographic apparatus, comprising:
a light source configured to generate light;
a light splitting unit configured to split the light from the light source into reference light and measuring light;
a detection unit configured to detect intensity of combined light obtained by combining the reference light with return light from an object to be inspected, which is irradiated with the measuring light;
an image forming unit configured to form a tomographic image of the object to be inspected based on the detected intensity; and
a locating unit configured to locate one of a plurality of objective lenses having different focal lengths and having the same dispersion amount on an optical axis at a position on an optical path of the measuring light opposed to the object to be inspected.

2. An optical coherence tomographic apparatus according to claim 1, wherein the plurality of objective lenses have different radii of curvature.

3. An optical coherence tomographic apparatus according to claim 1, wherein the plurality of objective lenses have the same optical distance on the optical axis.

4. An optical coherence tomographic apparatus according to claim 3,
wherein the plurality of objective lenses are formed of the same glass material, and
wherein the plurality of objective lenses have the same center thickness on the optical axis.

5. An optical coherence tomographic apparatus according to claim 1, wherein each of the plurality of objective lenses comprises a cemented doublet lens obtained by cementing two lenses formed of different glass materials.

6. An optical coherence tomographic apparatus according to claim 1, wherein at least one of the plurality of objective lenses comprises at least one aspheric surface in which a curvature becomes smaller in a peripheral portion as compared to a curvature on the optical axis.

7. An optical coherence tomographic apparatus according to claim 1, wherein each of the plurality of objective lenses is located by the locating unit such that a distance on the optical path of the measuring light from the object to be inspected to the objective lens to be located becomes a focal length of the objective lens to be located.

8. An optical coherence tomographic apparatus according to claim 1, further comprising:
a focus lens arranged on the optical path of the measuring light and configured to adjust a focus position; and
a control unit configured to control a position of the focus lens,
wherein the control unit is configured to drive a position of the focus lens on the optical axis in accordance with information of the objective lens to be located.

9. An optical coherence tomographic apparatus according to claim 8, wherein the information of the objective lens comprises the focal length of the objective lens.

10. An optical coherence tomographic apparatus according to claim 8, further comprising a lens information acquiring unit configured to acquire the information of the objective lens in accordance with a fact that the objective lens is selectively located at the position on the optical axis,
wherein the lens information acquiring unit is configured to transmit the acquired information of the objective lens to the control unit.

11. An optical coherence tomographic apparatus according to claim 1, wherein the locating unit is configured to automatically one of insert and separate the objective lens selected from the plurality of objective lenses with respect to the optical path of the measuring light.

12. An optical coherence tomographic apparatus according to claim 1, wherein the same dispersion amount means that a difference in dispersion amounts of a plurality of objective lenses is 60 or less.

13. An optical coherence tomographic apparatus, comprising:
   a light source configured to generate light;
   a light splitting unit configured to split the light from the light source into reference light and measuring light;
   a detection unit configured to detect intensity of combined light obtained by combining the reference light with return light from an object to be inspected, which is irradiated with the measuring light;
   an image forming unit configured to form a tomographic image of the object to be inspected based on the detected intensity; and
   a locating unit configured to locate one of a plurality of objective lenses having different focal lengths at a position on an optical path of the measuring light opposed to the object to be inspected, a difference in dispersion amounts of a plurality of objective lenses being 60 or less.

14. An optical coherence tomographic system, comprising:
   (a) an optical coherence tomographic apparatus comprising:
      (1) a light source configured to generate light;
      (2) a light splitting unit configured to split the light from the light source into reference light and measuring light;
      (3) a detection unit configured to detect intensity of combined light obtained by combining the reference light with return light from an object to be inspected, which is irradiated with the measuring light; and
      (4) an image forming unit configured to form a tomographic image of the object to be inspected based on the detected intensity; and
   (b) a plurality of objective lenses that have different focal lengths, one of the plurality of objective lenses being located at a position on an optical path of the measuring light opposed to the object to be inspected,
   wherein the plurality of objective lenses have the same dispersion amount on an optical axis.

15. An optical coherence tomographic system according to claim 14, wherein the plurality of objective lenses have the same optical distance on the optical axis.

16. An optical coherence tomographic system according to claim 14, wherein the plurality of objective lenses are selectively located at distances from the object to be inspected in accordance with the focal lengths on the optical path of the measuring light.

17. An optical coherence tomographic system according to claim 14, wherein the plurality of objective lenses have the same longitudinal resolution of the tomographic image.

\* \* \* \* \*